United States Patent
Khalfallah et al.

(10) Patent No.: US 7,167,610 B2
(45) Date of Patent: Jan. 23, 2007

(54) COMPACT AND RECONFIGURABLE OPTICAL DEVICE FOR CONTROLLED INSERTION/DROPPING OF OPTICAL RESOURCES

(75) Inventors: Sabry Khalfallah, Paris (FR); Arnaud Bisson, Orsay (FR)

(73) Assignee: Alcatel, Paris (FR)

( * ) Notice: Subject to any disclaimer, the term of this patent is extended or adjusted under 35 U.S.C. 154(b) by 14 days.

(21) Appl. No.: 10/999,965

(22) Filed: Dec. 1, 2004

(65) Prior Publication Data

US 2005/0185886 A1    Aug. 25, 2005

(30) Foreign Application Priority Data

Dec. 2, 2003    (FR) .................................. 03 14121

(51) Int. Cl.
   *G02B 6/28*    (2006.01)
(52) U.S. Cl. .......................................... 385/17; 385/24
(58) Field of Classification Search .................. 385/16, 385/17, 20–24; 398/45–51
   See application file for complete search history.

(56) References Cited

U.S. PATENT DOCUMENTS

| 6,204,946 | B1 | 3/2001 | Aksyuk et al. | |
| 6,690,846 | B1 * | 2/2004 | Zhou et al. | 385/15 |
| 2002/0196494 | A1 | 12/2002 | McGuire | |

FOREIGN PATENT DOCUMENTS

| EP | 0 930 799 A | 7/1999 |
| GB | 2 381 683 A | 5/2003 |
| WO | WO 01/08333 A | 2/2001 |
| WO | WO 03/098856 A | 11/2003 |

OTHER PUBLICATIONS

B. B. Dingel et al, "Photonic Add-Drop Multiplexing Perspective for Next Generation Optical Networks", Proceedings of the Spie, Bellingham, VA, vol. 4532, 2001, pp. 394-408, XP007872.
M. P. Earnshaw et al, "Integrated Reconfigurable Optical Wavelength add-drop Multiplexer", Electronics Letters, IEE Stevenage, GB, vol. 38, No. 22, Oct. 24, 2002, pp. 1351-1352, XP006019113.
U.S. Appl. No. 10/999,996, filed Dec. 1, 2004 entitled, "A Reconfigurable Optical Device For Controlled Insertion/Dropping of Optical Resources."

* cited by examiner

*Primary Examiner*—Kevin S. Wood
(74) *Attorney, Agent, or Firm*—Sughrue Mion, PLLC

(57) ABSTRACT

An optical multiplexer device is dedicated to inserting/dropping optical resources for an optical transmission line comprising an upstream fiber and a downstream fiber. The device comprises: first and second OMADs each having a first primary inlet/outlet connected to the upstream or downstream fiber, and to L internal demultiplexing channels connected to L first secondary inlets/outlets, and a second primary inlet/outlet connected to M internal multiplexing connected to M second secondary inlets/outlets, connected to M send or receive modules L external coupling channels interconnecting the L first secondary inlets/outlets, and each fitted with a respective VOA capable of placing itself in a through or blocking state for allowing or preventing an optical resource to be transferred between OMADs; and an external drop or insert channel connected to the upstream or downstream fiber, respectively, and to the first primary or second primary inlet/outlet of the second or first OMAD, respectively.

16 Claims, 1 Drawing Sheet

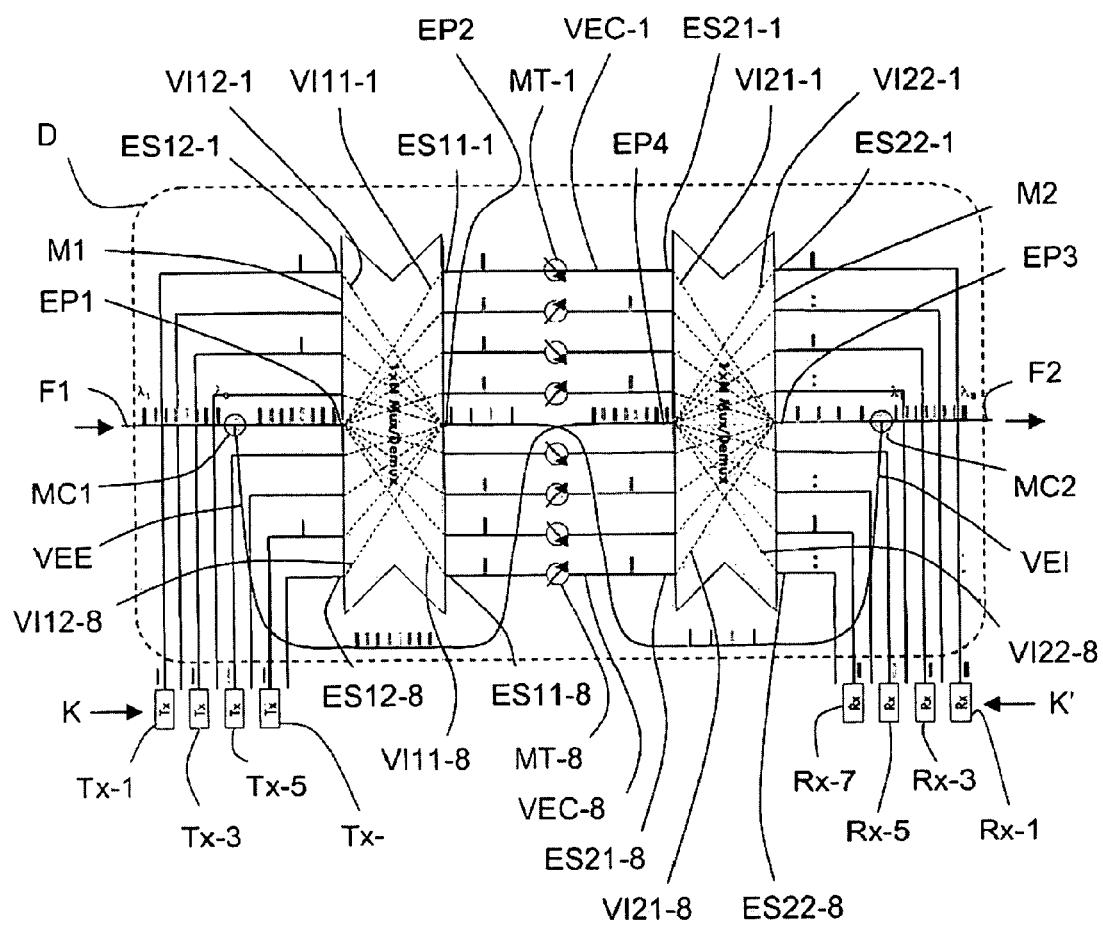
Figure unique

COMPACT AND RECONFIGURABLE OPTICAL DEVICE FOR CONTROLLED INSERTION/DROPPING OF OPTICAL RESOURCES

The invention relates to communications network equipment, and more precisely to optical multiplexing devices for insertion/dropping multiplexed optical resources, as installed in equipment constituting the nodes of a network.

The term "optical resources" is used herein to mean both wavelengths and wavelength bands.

As is known in the art, transferring multiplexed optical resources within a network is an operation that is complex. In general it requires resources that are being transferred, or information about those resources to be inserted or to be dropped, in particular at nodes of the network (such as routers). To do this, optical multiplexer devices for inserting/dropping multiplexed optical resources are used that are connected, either directly, or via optical amplifiers to the incoming (or upstream) and the outgoing (or downstream) optical fibers of optical transmission lines conveying multiplexed optical resources.

More precisely, an optical device of that type conventionally comprises an optical coupler connected to the upstream fiber in order to take a fraction of the wavelength division multiplexed resources and transmit said fraction via a first outlet to a demultiplexer of the 1 to N type, thereby delivering demultiplexed resources on N outlets so that they can be processed locally, for example in order to receive the data they contain or to regenerate the data. The second outlet of the coupler feeds an optical system that serves to cause those resources which are destined for the downstream optical fiber to pass, while blocking other resources.

In general, such an optical system comprises a demultiplexer of the 1 to N type, whose N outlets are connected to N external coupling channels, each fitted with a wavelength-blocking module, such as a variable optical attenuator (VOA) type module or a semiconductor optical amplifier (SOA) type module, themselves connected to the N inlets of an N to 1 type multiplexer serving to group together the demultiplexed resources. The resources regrouped in this way are then forwarded to a first inlet of a second coupler of the 2 to 1 type, having a second inlet used for adding new resources that have been previously been grouped together by another multiplexer, and having an outlet that feeds the outgoing fiber, optionally via an amplifier.

A conventional type of optical multiplexer device for inserting/dropping multiplexed optical resources thus comprises two multiplexers, two demultiplexers, two couplers, and N optical attenuator modules, thereby making it expensive and bulky.

An object of the invention is thus to improve the situation, in particular in terms of compactness.

To this end, the invention provides an optical multiplexer device for inserting/dropping optical resources for an optical transmission line for transmitting multiplexed optical resources and comprising at least one incoming (or upstream) optical fiber and at least one outgoing (or downstream) optical fiber.

The optical device is characterized by the fact that it comprises:

first multiplexer/demultiplexer means having at least a first primary incoming/outgoing connected to said upstream fiber and to L (L greater than or equal to 2), internal multiplexing/demultiplexing channels connected to L first secondary inlets/outlets, and at least one second primary inlet/outlet connected to M (M greater than 0), internal multiplexing/demultiplexing channels connected to M second secondary inlets/outlets connected to M send and/or receive modules;

a second multiplexer/demultiplexer means comprising at least a first primary inlet/outlet connected to said downstream fiber and L internal multiplexing/demultiplexing channels connected to L first secondary inlets/outlets, and at least one second primary inlet/outlet connected to N (N greater than or equal to 1), internal demultiplexing/multiplexing channels connected to N second secondary inlets/outlets connected to N receive and/or transmit modules;

L external coupling channels interconnecting said L first secondary inlets/outlets of the first and second multiplexer/demultiplexer means, and each fitted with a respective optical processor means suitable for responding to an order to place itself in one state selected from at least a through state and a blocking state respectively allowing and preventing an optical resource to be transferred between said first and second multiplexer/demultiplexer means; and an external drop and/or insert channel connected to said upstream fiber and to said second primary inlets/outlets of said second multiplexer/demultiplexer means, and an external insert and/or drop channel connected to said downstream fiber and to said second primary inlet/outlet of the first multiplexer/demultiplexer means.

As a result, the number of multiplexing and/or demultiplexing elements is reduced to two instead of four as in a conventional optical device.

The device of the invention may include other characteristics taken separately or in combination, and in particular:

it may be arranged to operate in both-way manner. In which case, each send and/or receive module and each receive and/or send module may be subdivided into a send module and a receive module each connected to a second secondary inlet/outlet via a circulator;

it may be arranged to operate in one-way manner. In which case, the M send and/or receive module(s) are send modules, while the L receive and/or send module (s) are receive modules;

the external drop and/or insert channel may be connected to the upstream fiber via a coupler of the 1 to 2 type, and the external insert and/or drop channel may be connected to the downstream optical fiber via a coupler of the 2 to 1 type;

the external drop and/or insert channel and the external insert and/or drop channel may be made in the form of optical fibers or in the form of planar technology waveguides (in particular when the device is of the "fully integrated" type);

the optical processor means may be variable optical attenuator means or semiconductor optical amplifier means. They may also optionally be placed (on order) in an additional state for intermediate transmission in which they allow an optical resource to be transferred with attenuation or with power amplification between the first and second multiplexer/demultiplexer means; and each of the first and second multiplexer/demultiplexer means may be implemented in the form of a phase grating demultiplexer, and in particular an arrayed waveguide grating (AWG), particularly when the optical resources are wavelengths.

The invention is particularly well adapted, although not exclusively, to the field of optical communications, in particular when the optical resources are wavelengths or wavelength bands.

Other characteristics and advantages of the invention appear on examining the following detailed description and the accompanying drawing, in which the sole FIGURE is a diagram of an embodiment of an optical multiplexer device of the invention for inserting/dropping optical resources. The accompanying drawings serve not only to add to the description of the invention, but may also contribute to defining it, where appropriate.

The invention seeks to enable optical resources to be inserted and dropped within a line for transmitting multiplexed optical resources and belonging to a communications network, for example.

As shown in the sole FIGURE, a transmission line is generally made up of optical fiber portions interconnected via items of network equipment constituting network nodes, such as routers. Each node of a network is thus connected to at least one incoming optical fiber (or upstream fiber) F1 and to at least one outgoing optical fiber (or downstream fiber) F2 suitable for conveying multiplexed optical resources.

In order to enable optical resources to be inserted and dropped to and from the transmission line, the node (or equipment) includes an optical multiplexer device D in accordance with the invention for inserting/dropping optical resources.

Below, it is assumed that the optical resources that are inserted and dropped are wavelengths, but they could equally be wavelength bands.

The device D comprises first and second multiplexer/demultiplexer means M1 and M2 of the both-way type serving both to demultiplex and to multiplex optical resources. Each of them is constituted by an optical multiplexer and demultiplexer (OMAD), e.g. implemented in the form of a phase grating demultiplexer of the arrayed waveguide grating (AWG) type.

The device D may operate either in one-way mode, i.e. from the upstream fiber F1 to the downstream fiber F2 (or vice versa), or else in both-way mode. The description below relates to one-way operation from the upstream fiber F1 to the downstream fiber F2, corresponding to the sole FIGURE.

The first OMAD M1 comprises firstly at least one primary inlet EP1 connected to the upstream fiber F1 together with L internal demultiplexing channels VI11-1 to VI11-L, themselves connected to L first secondary outlets ES11-1 to ES11-L. In this case L is equal to eight (8), however it could have any integer value greater than or equal to two (2). In this case, the primary inlet EP1 opens out to the upstream face (beside the upstream fiber F1) of the OMAD M1, while the first secondary outlets ES11-1 to ES11-8 open out to the downstream face (beside the downstream fiber F2) of said OMAD M1.

The term "internal channel" does not necessarily designate a physical or optical path, but rather correspondence between an inlet and an outlet depending on wavelength, in particular when the OMAD is of the AWG type.

The first OMAD M1 also has at least one primary outlet EP2 connected to M internal multiplexing channels VI12-1 to VI12-M connected to M second secondary inlet(s) ES12-1 to ES12-M, themselves connected to M send and/or receive modules K-1 to K-M. In this case M is equal to eight (8), but it could have any integer value greater than or equal to one (1). In this case, the primary outlet EP2 opens out to the downstream face of the OMAD M1, while the second secondary inlets ES12-1 to ES12-8 open out to the upstream face of said OMAD M1.

Furthermore, the M send and/or receive module(s) K are, in this case, solely send modules Tx, because the device is arranged to operate in one-way mode. It is assumed that the optical resources travel from the upstream fiber F1 to the downstream fiber F2, and not in the opposite direction. However, in a mode using both-way operation, the modules K could each be constituted by a send module Tx and a receive module Rx. In the one-way case, each send module Tx is connected to a second secondary inlet ES12 by coupling means such as an optical fiber. In the both-way case, each send module Tx and Rx may be connected to a second secondary inlet/outlet ES12 by a coupling means such as an optical fiber, via a circulator.

Thus, the primary inlet EP1 serves to feed the eight internal demultiplexing channels VI11-1 to VI11-8 with multiplexed optical resources presenting wavelengths $\lambda 1$ to $\lambda 8$ (and "transporting" respective optical signals S1 to S8). The eight internal demultiplexing channels VI11-1 to VI11-8 serve to demultiplex these optical resources so as to deliver respective ones of the wavelengths $\lambda 1$ to $\lambda 8$ on the respective first secondary outlets ES11-1 to ES11-8.

The eight internal multiplexing channels VI12-1 to VI12-8 serve to multiplex (or group together) the optical resources for insertion, each resource presenting a respective one of the wavelengths $\lambda 1$ to $\lambda 8$ (and "transporting" a respective one of optical signals Z1 to Z8), which resources are received on respective second secondary inlets ES12-1 to ES12-8 which receive them from the send modules Tx-1 to Tx-8. The primary outlet EP2 delivers the multiplexed optical resources for insertion that present the wavelengths $\lambda 1$ to $\lambda 8$ (optical signals Z1 to Z8).

The second OMAD M2 comprises firstly at least one primary outlet EP3 connected to the downstream fiber F2 and to L internal multiplexing channels VI12-1 to VI21-L, themselves connected to the L first secondary inlets ES21-1 to ES21-L. As stated above, L in this case is equal to eight (8). In this case, the primary outlet EP3 opens out to the downstream face of the OMAD M2, while the primary secondary inlets ES21-1 to ES21-8 open out to the upstream face of said OMAD M2.

The second OMAD M2 also has at least one primary inlet EP4 connected to N internal demultiplexing channels VI22-1 to VI22-N connected to N second secondary outlet (s) ES22-1 to ES22-N, themselves connected to N send and/or receive module(s) K'-1 to K'-N. In this case, N is equal to M, and thus to eight (8), but it could have any integer value greater than or equal to one (1). In this case, the primary inlet EP4 opens out to the upstream face of the OMAD M2, while the second secondary outlets ES22-1 to ES22-8 open out to the downstream face of said OMAD M2.

Furthermore, the N send and/or receive module(s) K' are constituted in this case solely by receive modules Rx since, as mentioned above, the device being described is arranged to operate in one-way mode. However, in a both-way mode of operation, these modules could each be constituted by a send module Tx and a receive module Rx. In the one-way case, each receive module Rx is connected to a second secondary outlet ES22 by a coupling means such as an optical fiber. In the both-way case, each send and receive module Tx and Rx may be connected to a second secondary inlet/outlet ES22 by a coupling means such as an optical fiber, via circulator.

The first secondary outlets ES11-1 to ES11-8 are connected respectively to the first secondary inlets ES21-1 to ES21-8 via eight (8) external coupling channels VEC-1 to VEC-8 each fitted with respective optical processor means MT-1 to MT-8.

In this case, these eight (8) external coupling channels VEC-1 to VEC-8 serve to transfer the optical resources as demultiplexed by the eight internal demultiplexing channels VI11-1 to VI11-8 and coming from the upstream fiber F1 from the first OMAD M1 to the second OMAD M2.

When the device is of the "fully-integrated" type, the external coupling channels VEC may be implemented in the form of waveguides. Otherwise, the external coupling channels VEC may be implemented in the form of optical fibers.

Each optical processor means MT-1 to MT-8 is a wavelength-blocking module serving to allow or prevent the transfer of an optical resource between the first and second OMADs M1 and M2 depending on the orders (or instructions or signals) that it receives from the equipment (or node). Each of said means can be placed selectively in at least one through state that allows transfer or in at least one blocking state that prevents transfer.

However, each optical processor means MT-1 to MT-8 may also, optionally, be placed in at least one other, or "intermediate", state in which it allows an optical resource to be transferred with power attenuation or with power amplification.

For example, each optical processor means MT-1 to MT-8 can be implemented in the form of a variable optical attenuator (VOA) module. In a variant, each optical processor means MT-1 to MT-8 can be implemented in the form of a semiconductor optical amplifier (SOA) module, thus enabling it to amplify an optical resource being transferred.

The eight internal multiplexing channels VI21-1 to VI21-8 thus serve in the present case to multiplex the optical resources for transfer that they receive respectively from the first secondary inlets ES21-1 to ES21-8, each of which presents one of the wavelengths λ1 to λ8. The primary outlet EP3 serves to feed the downstream fiber F2 with multiplexed optical resources presenting wavelengths λ1 to λ8 delivered by the internal multiplexing channels VI21-1 to VI21-8.

The device D of the invention also includes an external drop channel VEE connected firstly to the upstream fiber F1 via first coupling means MC1 and secondly to the primary inlet EP4 of the second OMAD M2. Given that the device in this example is of the one-way type, the external channel VEE is dedicated solely to dropping (i.e. extracting) multiplexed resources from the upstream fiber F1. Naturally, in a both-way mode of operation, it would serve equally well for dropping multiplexed optical resources from the upstream fiber F1 and for inserting multiplexed optical resources into the upstream fiber F1.

The first coupler means MC1 is preferably implemented in the form of a 1 to 2 type optical coupler. In which case, its inlet is connected to the outlet of the upstream fiber F1, while its two outlets are connected respectively to the inlet of the external drop channel VEE and to the primary inlet EP1 of the first OMAD M1.

The term "drop optical resources" is used herein to mean extracting in conventional manner a fraction of the power of the optical resources in order to feed the external drop channel VEE, with the remainder of the power feeding the first OMAD M1. For this purpose, the coupler MC1 may be of the 3 decibel (dB) type, for example.

The device D of the invention also includes an external insert channel VEI connected firstly to the downstream fiber F2 via a second coupler means MC2, and secondly to the primary outlet EP2 of the first OMAD M1. Given that the device in this example is of the one-way type, the external channel VEI is dedicated solely to inserting multiplexed optical resources into the downstream fiber F2. Naturally, in a both-way mode of operation, it would also serve to extract multiplexed optical resources from the downstream fiber F2 and to insert multiplexed resources into the downstream fiber F2.

The second coupling means MC2 is preferably implemented in the form of a 2 to 1 type optical coupler. In which case, its inlets are connected respectively to the outlets of the external insert channel VEI and to the primary outlet EP3 of the second OMAD M2, while its outlet is connected to the inlet of the downstream fiber F2.

The primary inlet EP4 of the second OMAD M2 thus serves in this case to feed the eight internal demultiplexing channels VI22-1 to VI22-8 with multiplexed optical resources for dropping that present respective wavelengths λ1 to λ8. The eight internal demultiplexing channels VI22-1 to VI22-8 serve to demultiplex these optical resources so as to deliver to the second secondary outlets ES22-1 to ES22-8, a respective one of the wavelengths λ1 to λ8, so as to feed the receive modules Rx-1 to Rx-8.

Furthermore, the multiplexed optical resources for insertion, presenting wavelengths λ1 to λ8 (and "transporting" the respective optical signals Z1 to Z8) coming from the send modules Tx-1 to Tx-8 are inserted into the downstream fiber F2 by the external insert channel VEI.

The external drop channel VEE and the external insert channel VEI can be made in the form of optical fibers, or else in the form of waveguides, e.g. using planar technology, particularly when the device is of the fully integrated type.

The example device shown in the sole FIGURE has two OMADs M1 and M2 of the AWG type. That is why the primary inlets EP1 and EP4 and outlets EP2 and EP3 are all located in the centers of their respective OMADs, while the secondary inlets ES12 and ES21 and outlets ES11 and ES22 are implanted on either side of the primary inlets and outlets EP1 to EP4.

As mentioned above, the above-described device D is for operation in a one-way mode. In order to enable the device D to operate in a both-way mode, certain adjustments need to be made.

Firstly, the primary inlets EP1 and EP4 and outlets EP2 and EP3 all become primary inlets/outlets.

Then, the secondary inlets ES12 and ES21 and outlets ES11 and ES22 all become secondary inlets/outlets.

In addition, the internal multiplexing channels VI12 and VI21 and the internal demultiplexing channels VI11 and VI22 all become internal multiplexing/demultiplexing channels.

Furthermore, the external insert channel VEI and the external drop channel VEE become external insert and drop channels.

Finally, the processor means MT fitted to each external coupling channel VEC and implemented in the form of a VOA or an SOA (or the equivalent) need to be replaced as follows. Each external coupling channel VEC needs to be fitted with two circulators (one to two) with two parallel channels being interposed between them, serving to connect to their two inlets/outlets two VOAs or two SOAs (or equivalent modules).

There follows a description of an example of one-way operation of the device D of the invention with reference to the state shown in the sole FIGURE.

In the state shown, the device D is to drop the signals S1, S3, S5, and S7 arriving on the upstream fiber F1 and presenting respective wavelengths λ1, λ3, λ5, and λ7, and to insert signals Z1, Z3, Z5, and Z7 presenting respective wavelengths λ1, λ3, λ5, and λ7, while transferring from the upstream fiber F1 to the downstream fiber F2 the signals S2, S4, S6, and S8 presenting respective wavelengths λ2, λ4, λ6, and λ8.

The device D therefore receives on the outlet from the upstream fiber F1 multiplexed optical resources presenting wavelengths λ1 to λ8 and "transporting" respective optical signals S1 to S8. A fraction of the power of these optical resources is taken by the first coupler MC1 to feed the external drop channel VEE, while the remaining fraction feeds the primary inlet EP1. The optical resources (S1 to S8) are then demultiplexed on the internal channels VI11-1 to VI11-8 and delivered to the first secondary outlets ES11-1 to ES11-8.

Simultaneously, the send modules Tx-1, Tx-3, Tx-5, and Tx-7 feed the second secondary inlets ES12-1, ES12-3, ES12-5, and ES12-7 of the OMAD M1 with optical resources presenting respective wavelengths λ1, λ3, λ5, and λ7, and transporting the signals Z1, Z3, Z5, and Z7. They are then grouped together by the internal channels VI12-1 to VI12-8 and delivered in multiplexed form to the primary outlet EP2 of the OMAD M1 and then injected into the external insert channel VEI.

The external drop channel VEE feeds the primary inlet EP4 of the OMAD M2 with multiplexed resources presenting the wavelengths λ1 to λ8 and transporting the optical signals S1 to S8, respectively. These optical resources are then demultiplexed on the internal channels VI22-1 to VI22-8 and delivered to the second secondary outlets ES22-1 to ES22-8, presenting respective wavelengths λ1 to λ8 and transporting the optical signals S1 to S8, respectively. These demultiplexed optical resources then feed the receive modules Rx-1 to Rx-8, and only the signals S1, S3, S5, and S7 are then communicated.

Furthermore, since only the signals S2, S4, S6, and S8 are to be transferred to the downstream fiber F2, the VOAs MT-1, MT-3, MT-5, and M5-7 are placed in their blocking state, while the VOAs MT-2, MT-4, MT-6, and MT-8 are placed in their through states. Thus, only those optical resources that present the wavelengths λ2, λ4, λ6, and λ8 and that transport the signals S2, S4, S6, and S8 respectively reach the first secondary inlets ES21-1 to ES21-8 of the OMAD M2. They are then grouped together by the internal channels VI21-1 to VI21-8 and delivered in multiplexed form to the primary outlet EP3 coupled to one of the two inlets of the second coupler MC2.

In addition, the external insert channel VE1 feeds the second inlet of the second coupler MC2 with optical resources presenting wavelengths λ1, λ3, λ5, and λ7, and transporting the signals Z1, Z3, Z5, and Z7, respectively.

Finally, the second coupler MC2 feeds via its outlet the inlet to the downstream fiber F2 with the multiplexed optical resources presenting the wavelengths λ1 to λ8 respectively and transporting the optical signals Z1, S2, Z3, S4, Z5, S6, Z7, and S8, respectively.

Naturally, the device D may be reconfigured in a wide variety of ways in order to insert and drop any combination other than that described above. Furthermore, it is important to observe that in the presence of amplifier modules (SOAs) replacing the attenuator modules (VOAs), it is possible to amplify the power of the optical resources being transferred so as to compensate for the power fraction that is taken (or dropped) by the first coupler MC1 which feeds the external drop channel VEE, and possibly also to compensate for the losses introduced by remainder of the device.

The invention provides an optical multiplexer device for inserting/dropping optical resources that is compact, of reduced cost (and possibly of low cost when fully integrated), and that is easy to integrate.

The invention is not limited to the embodiment of the optical device and the network equipment as described above, merely by way of example, but covers all variants that the person skilled in the art might devise in the ambit of the claims below.

Thus, the description above relates to an optical multiplexer device arranged to insert and drop optical resources that are in the form of wavelengths. However, the invention also applies to inserting and dropping optical resources that are in the form of wavelength bands. Under such circumstances, it is possible in particular to replace the first and second multiplexer/demultiplexer means (of the OMAD type) by multiplexer/demultiplexer means adapted to transferring wavelength bands, of the type described in patent document WO 02/46815.

What is claimed is:

1. An optical multiplexer device for inserting/dropping optical resources for a line for an optical transmission line for transmitting multiplexed optical resources, the line comprising at least one upstream optical fiber and at least one downstream optical fiber, and the device comprising:

a first multiplexer and demuliplexer means having at least a first primary inlet and outlet connected to said upstream fiber and to L internal multiplexing and demultiplexing channels connected to L first secondary inlets and outlets, and at least one second primary inlet and outlet connected to M internal multiplexing and demultiplexing channels connected to M second secondary inlets and outlets connected to M send and/or receive modules, wherein L is an integer greater than 1 and M is an integer greater than 0;

a second multiplexer and demultiplexer means comprising at least a first primary inlet and outlet connected to said downstream fiber and L internal multiplexing and demultiplexing channels connected to L first secondary inlets and outlets and at least one second primary inlet and outlet connected to N, internal demultiplexing/ multiplexing channels connected to N second secondary inlets and outlets connected to N receive and/or transmit modules, wherein N is an integer greater than 0;

L external coupling channels interconnecting said L first secondary inlets and outlets of the first and second multiplexer and demultiplexer means, and each fitted with a respective optical processor means, suitable for responding to an order to place each respective optical processor means in one state selected from at least a through state and a blocking state respectively allowing and preventing an optical resource to be transferred between said first and second multiplexer and demultiplexer means; and an external drop and/or insert channel connected to said upstream fiber and to said second primary inlets and outlets of said second multiplexer and demultiplexer means, and an external insert and/or drop channel connected to said downstream fiber and to said second primary inlet and outlet of the first multiplexer and demultiplexer means.

2. A device according to claim 1, wherein in the device is arranged to operate in a both-way manner.

3. A device according to claim 2, wherein each send and/or receive module and each receive and/or send module is subdivided into a send module and a receive module each connected to a second secondary inlet and outlet via a circulator.

4. A device according to claim 1, wherein each of the M send and/or receive module is a send module, and each of the L receive and/or transmit modules is a receive module.

5. A device according to claim 1, wherein said external drop and/or insert channel is connected to said upstream fiber via a 1 to 2 type coupler, and said external insert and/or drop channel is connected to said downstream fiber via a 2 to 1 type coupler.

6. A device according to claim 1, wherein said external drop and/or insert channel and said external insert and/or drop channel are implemented in the form of optical fibers.

7. A device according to claim 1, wherein said external drop and/or insert channel and said external insert and/or drop channel are implemented in the form of planar technology waveguides.

8. A device according to claim 1, wherein said optical processor means are variable optical attenuator means suitable, on order, for placing each respective variable optical attenuator means in said blocking state or in said through state.

9. A device according to claim 8, wherein each of the variable optical attenuator means is suitable, on order, for placing each of the respective variable optical attenuator means in an intermediate transmission state in which each of the respective variable optical attenuator means allows an optical resource to be transferred with power attenuation between said first and second multiplexer and demultiplexer means.

10. A device according to claim 1, wherein each of said optical processor means is a semiconductor optical amplifier means suitable, on order, for placing each respective semiconductor optical amplifier means in said blocking state or in said through state.

11. A device according to claim 10, wherein each of the semiconductor optical amplifier means is suitable, on order, for placing each respective semiconductor optical amplifier means in an amplification state in which the semiconductor optical amplifier means allows an optical resource to be transferred with power amplification between said first and second multiplexer and demultiplexer means.

12. A device according to claim 1, wherein each of said first and second multiplexer and demultiplexer means is implemented in the form of a phase grating demultiplexer, in particular of the AWG type.

13. A device according to claim 1, wherein said optical resources are wavelengths.

14. A device according to claim 1, wherein said optical resources are wavelength bands.

15. The device according to claim 1, wherein the device is arranged to operate in a two-way manner.

16. The device according to claim 1, wherein the first multiplexer and demultiplexer means and the second multiplexer and demultiplexer means are each operable to multiplex and demultiplex a signal.

* * * * *